(12) United States Patent
Chiang (10) Patent No.: US 7,273,548 B2
(45) Date of Patent: *Sep. 25, 2007

(54) FLUID FILTER

(76) Inventor: Charles N. Chiang, 520 Kingsford St., Monterey Park, CA (US) 91754

( * ) Notice: Subject to any disclaimer, the term of this patent is extended or adjusted under 35 U.S.C. 154(b) by 110 days.

This patent is subject to a terminal disclaimer.

(21) Appl. No.: 11/102,457

(22) Filed: Apr. 8, 2005

(65) Prior Publication Data

US 2005/0230301 A1 Oct. 20, 2005

Related U.S. Application Data

(63) Continuation-in-part of application No. 10/279,235, filed on Oct. 25, 2002, now Pat. No. 6,869,531.

(51) Int. Cl.
*E02B 15/04* (2006.01)
(52) U.S. Cl. .................. 210/187; 210/242.3; 210/519; 210/538; 210/923
(58) Field of Classification Search ............... 210/776, 210/242.3, 299, 307, 514, 470, 187, 519, 210/538, 923, 540
See application file for complete search history.

(56) References Cited

U.S. PATENT DOCUMENTS 1,200,951 A * 10/1916 Kelly, Jr. .................... 210/540
1,702,612 A * 2/1929 Morse ......................... 210/187
2,575,768 A * 11/1951 Pearsall ....................... 210/513
2,795,119 A * 6/1957 Bair ............................. 30/325
3,326,384 A * 6/1967 Wessels ....................... 210/470
3,392,845 A * 7/1968 Shapiro et al. ............. 210/470
4,921,605 A * 5/1990 Chastan-Bagnis et al. ........ 210/242.3
5,084,177 A * 1/1992 Keene .......................... 210/514
5,510,028 A * 4/1996 Kuhlman ..................... 210/514
5,526,737 A * 6/1996 Betzen ........................ 99/496
5,560,109 A * 10/1996 Lam ............................. 30/325
6,443,313 B1 * 9/2002 Uli ............................. 210/470
6,517,715 B1 * 2/2003 Batten et al. ............... 210/538

* cited by examiner

*Primary Examiner*—Christopher Upton
(74) *Attorney, Agent, or Firm*—Raymond Y. Chan; David and Raymond Patent Group (57) ABSTRACT

A fluid filter, which is adapted for separating a less dense fluid floating on a high dense fluid, includes at least a fluid filtering arrangement including a floating wing adapted for floating on the less dense fluid and at least a fluid outlet formed on the floating wing, and a container body, which is extended from the floating wing, having a fluid collecting cavity communicating with the fluid outlet, wherein the fluid outlet is formed at a position above the fluid collecting cavity. Therefore, when a downward force is applied on the floating wing until the fluid outlet is slightly positioned below a surface level of the less dense fluid, the less dense fluid is allowed to flow into the fluid collecting cavity through the fluid outlet by gravity.

20 Claims, 10 Drawing Sheets

FLUID FILTER

CROSS REFERENCE OF RELATED APPLICATION

This is a Continuation-In-Parts application of a non-provisional application, application Ser. No. 10/279,235 filed on Oct. 25, 2002 now U.S. Pat. No. 6,869,531.

BACKGROUND OF THE PRESENT INVENTION

1. Field of Invention

The present invention relates to a fluid separating device, and more particularly to a fluid filter which is capable of effectively separating a less dense fluid floating on a high dense fluid in accordance with the Pascal's law.

2. Description of Related Arts

Due to the physical properties, when two fluids having different densities, the fluid having less density floats on top of the fluid having high density, such as oil and water. However, no particular tool is found in order to separate the two different fluids.

For example, people would like order a soup while they are taking their meal since the soup contains all the nutrition of the ingredients and is easy to digest. However, while making the soup, not only the nutrition from the ingredients is dissolved in the soup but also the fat is squeezed out from the ingredients. Since the fat, especially the fat from the meat, is bad for your health, people would like to remove the fat or the grease from the soup before they take the soup. However, there is no particular tool for the chef to remove the grease from the soup.

Since the density of the grease is lesser than the density of the soup, the grease will float on top of the soup. People would like to use a spoon to spoon up the grease from the soup. However, while spooning up the grease, it is unavoidable to spoon up the soup as well. Moreover, such method wastes lots of time for the chef to spoon up the grease little by little from a big soup kettle. Once the soup is stirred by the spoon, the grease is broken down and dissolve back into the soup in such a manner that the chef must wait until the grease gathers and reforms and floats on the soup for collecting purpose. Furthermore, the ingredients may enter into a cavity of the spoon at the entrance edge thereof while spooning up the grease.

Therefore, most people will merely pour out the top portion of the soup in order to get rid of the grease. However, not only the grease but also large portion of the soup are drained away at the same time, such that it is a waste of the soup while the chef spends lots of time to prepare the soup.

An alternative method is to put the kettle or bowl of soup in the refrigerator such that the grease is condensed to be hardened. Therefore, the chef can easily spoon up the grease. However, it takes more time to freeze and re-heat the soup before the soup is ready for serving. Thus, the taste of the soup will be destroyed by the re-heating process and is not as good as it is freshly cooked, especially vegetable ingredients and some meat or poultry color and taste, not to mention the nutrition value, will be changed or even destroyed after re-cook.

On the other hand, floating oil in the oceans is one of the ugliest forms of marine pollution. The massive tanker spills, oiled marine creatures, gave environmentalists a lot of headaches. Especially, the oil tank wreckages could cause oil pollution disaster, in which the gooey black oil extending over squares of miles and cause enormous public panic.

Once the oil is spilled into the water from tanks, the booms and skimmers have to be deployed for trapping the surface oil. Or otherwise, aircrafts are applied for spraying chemicals to break up the oil as well as assist the oil degrade faster to reduce the damage to the environment. Commonly, at least two boats are provided to tow a boom which collects the oil, and a skimmer at the back of the boom to remove the oil from the ocean.

Unfortunately, this process of employing such booms and skimmers are so complicated. The booms are made of expensive materials and have to be floatedly extended onto the sea surface. What is more, the cruising directions of the skimmers are decided by the towing ships. That is to say, at least three vessels are provided for trapping the polluted oils in practices. For most of the cases, such salvaging mission are so costly and complicated, the floated spilling oil would have to be burned off for merely polluting the atmosphere.

SUMMARY OF THE PRESENT INVENTION

A main object of the present invention is to provide a fluid filter which capable of quickly and effectively separating a less dense fluid floating on a high dense fluid in accordance with the Pascal's law. For example, only an upper layer of the soup, i.e. the grease, is collected by the fluid filter.

Another object of the present invention is to provide a fluid filter, wherein due to the physical properties of the less dense fluid that floats on top of the high dense fluid, a fluid filtering arrangement of the fluid filter is arranged to float on the less dense fluid for collecting the less dense fluid to the fluid collecting cavity from the high dense fluid, so as to prevent the high dense fluid being collected by the fluid filtering arrangement.

Another object of the present invention is to provide a fluid filter, wherein the fluid filter is capable of being used for removing the grease from the soup, so as to enhance the cooking speed since the grease is removed and collected during cooking process. In other words, the user does not have to cool down or even freeze the soup for removing the grease.

Another object of the present invention is to provide a fluid filter, wherein when the fluid filter is used as a grease removing tool for cooking, no grease is remained on the soup so as to lower the boiling point of the soup. In other words, no energy is wasted to heat up the grease during cooking.

Another object of the present invention is to provide a fluid filter, wherein a fluid outlet of the fluid filtering arrangement is positioned above the fluid collecting cavity in such a manner that the less dense fluid is flowed into the fluid collecting cavity through fluid outlet by gravity. In other words, no suction mechanism is required to incorporate with the present invention.

Another object of the present invention is to provide a fluid filter, wherein any substance floats either on the less dense fluid or the high dense fluid is blocked to flow into the fluid collecting cavity. In other words, only the less dense fluid is allowed to flow into and collect in the fluid collecting cavity. Therefore, for example, the ingredients in the soup are blocked by the fluid filter such that only the grease is collected in the fluid collecting cavity.

Another object of the present invention is to provide a fluid filter, wherein the collection operation of the fluid filter is simple that every individual is able to operate the present invention without complicated instruction.

Another object of the present invention is to provide a fluid filter, wherein no expensive or complicated structure is required to employ in the present invention in order to achieve the above mentioned objects. Therefore, the present invention successfully provides an economic and efficient solution to separate and collect the less dense fluid from the high dense fluid.

Another object of the present invention is to provide a fluid filter for separating oil floated on the ocean, wherein the floated oil could be easily trapped, or poured into the fluid filter for recovering less density oil from the water, wherein such fluid filter could be simply attached onto a tug boat for facilitating oil salvaging professionals accomplish their jobs.

Accordingly, in order to accomplish the above objects, the present invention provides a fluid filter for separating a less dense fluid floating on a high dense fluid, comprising:

at least a fluid filtering arrangement comprising a floating wing adapted for floating on the less dense fluid, and having at least a fluid outlet formed on the floating wing; and a container body, which is extended from the floating wing, having a fluid collecting cavity communicating with the fluid outlet, wherein the fluid outlet is formed at a position above the fluid collecting cavity, thereby, when a downward force is applied on the floating wing until the fluid outlet is slightly positioned below a surface level of the less dense fluid, the less dense fluid is allowed to flow into the fluid collecting cavity through the fluid outlet by gravity.

DETAILED DESCRIPTION OF THE PREFERRED EMBODIMENT

Figure 1:
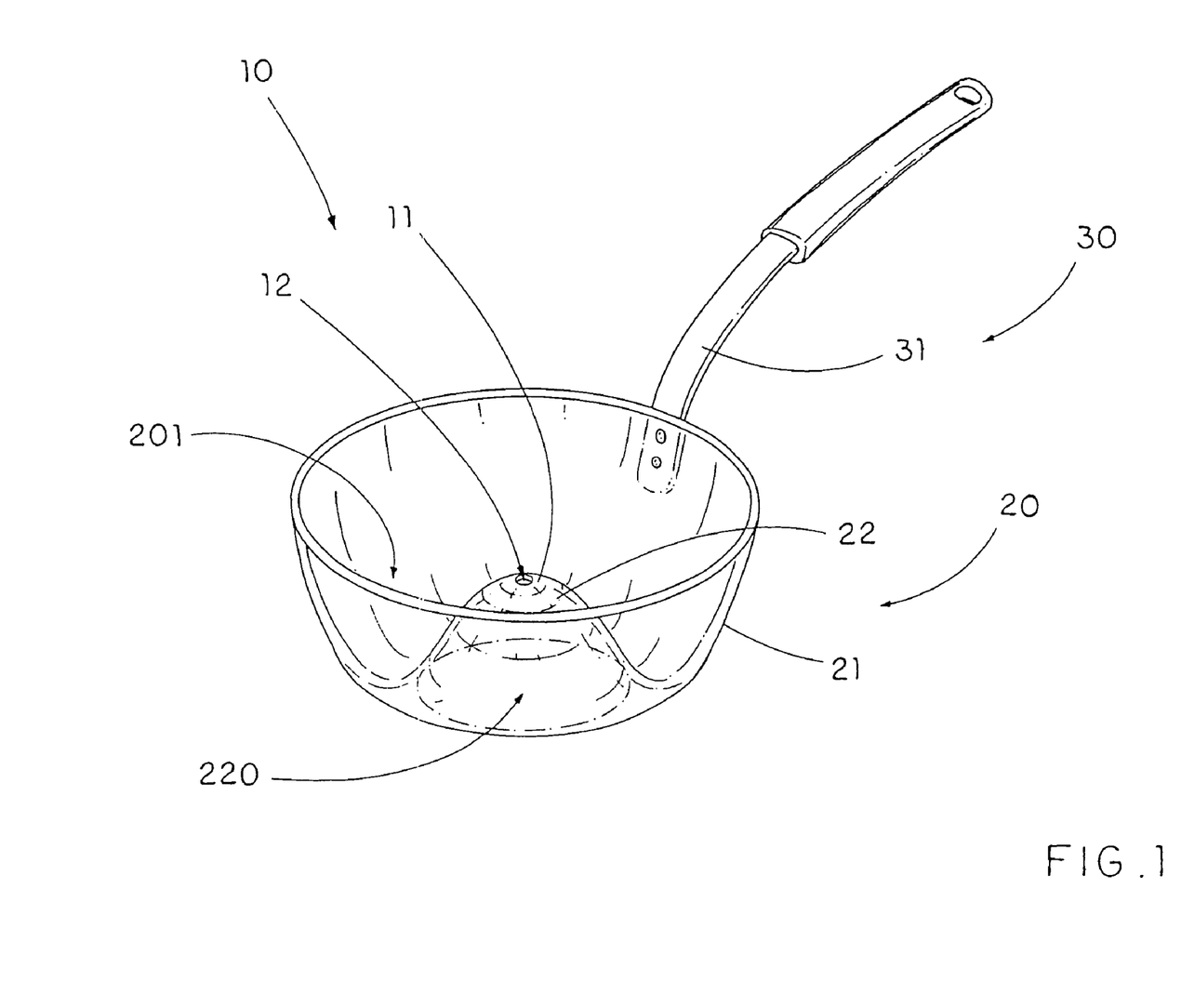
FIG. 1 is a perspective view of a fluid filter according to a first preferred embodiment of the present invention.
Figure 2A:
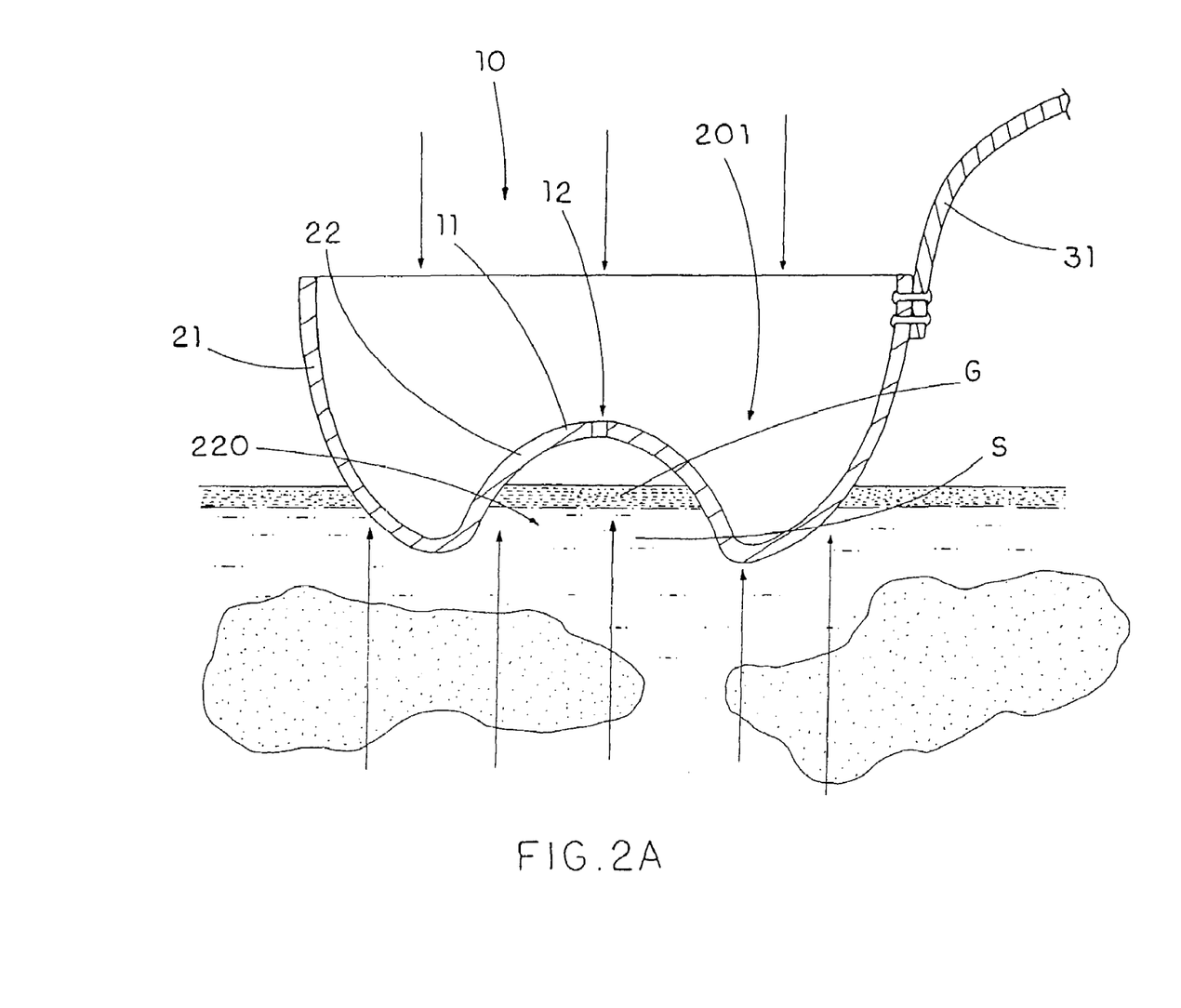
FIGS. 2A and 2B are sectional views of the fluid filter according to the above first preferred embodiment of the present invention.

Referring to FIGS. 1 and 2A of the drawings, a fluid filter according to a first preferred embodiment of the present invention is illustrated, wherein the fluid filter is capable of quickly and effectively separating a less dense fluid from a high dense fluid while the less dense fluid floats on the high dense fluid.

According to the preferred embodiment, the fluid filter is capable of separating and collecting the less dense fluid from the high dense fluid wherein the less dense fluid is embodied as a grease G and the high dense fluid is embodied as a soup S since the grease G floats on top of the soup S.

As shown in FIG. 1, the fluid filter comprises at least a fluid filtering arrangement 10 comprising a floating wing 11 adapted for floating on the grease G and having at least a fluid outlet 12 formed on the floating wing 11, and a container body 20, which is extended from the floating wing 11, having a fluid collecting cavity 201 communicating with the fluid outlet 12 wherein the fluid outlet 12 is formed at an apex above the fluid collecting cavity 201. Therefore, when a downward force is applied on the floating wing 11 until the fluid outlet 12 is slightly positioned below the surface level of the grease G, the grease G is allowed to flow into the fluid collecting cavity 201 through the fluid outlet 12 by gravity.

According to the preferred embodiment, the container body 20 comprises an outer surrounding wall 21 and an inner surrounding wall 22, defining an inner receiving cavity 220, integrally extended from the outer surrounding wall 21 at a bottom edge thereof to form the fluid collecting cavity 201 therebetween, wherein the floating wing 11 is extended from an upper end portion of the inner surrounding wall 22 in such a manner that the fluid collecting cavity 201 is communicated with the inner receiving cavity 220 through the fluid outlet 12 for allowing the grease G within the inner receiving cavity 220 flowing into the fluid collecting cavity 201 through the fluid outlet 12.

The inner surrounding wall 22 is formed as a hollow conical shape such that the inner receiving cavity 220 has a cross sectional area gradually reducing towards a peak thereof, wherein the fluid outlet 12 is formed at the peak of the inner surrounding wall 22. As shown in FIG. 2A, the outer surrounding wall 21 has a height higher than a height of the inner surrounding wall 22 in such a manner that when the fluid outlet 12 is moved slightly below the surface level of the grease G for allowing the grease G flowing through the fluid outlet 12, a top edge of the outer surrounding wall 21 is positioned above the surface level of the grease G, so that the outer surrounding wall 21 is capable of retaining the grease G within the fluid collecting cavity 201 so as to prevent the grease G leaking therefrom.

The container body 20 has a bottom curved surface formed by the outer and inner surrounding walls 21, 22 wherein the bottom curved surface of the container body 20 is adapted for guiding the grease G and the soup S flowing into the inner receiving cavity 220 while the downward force is applied on the container body 20. In other words, when the container body 20 is pressed downwardly, the soup G with the grease S is forced to either flow to an exterior of the outer surrounding wall 21 or into the inner receiving cavity 220, so as to prevent the grease G staying at the bottom side of the container body 20.

Figure 2B:
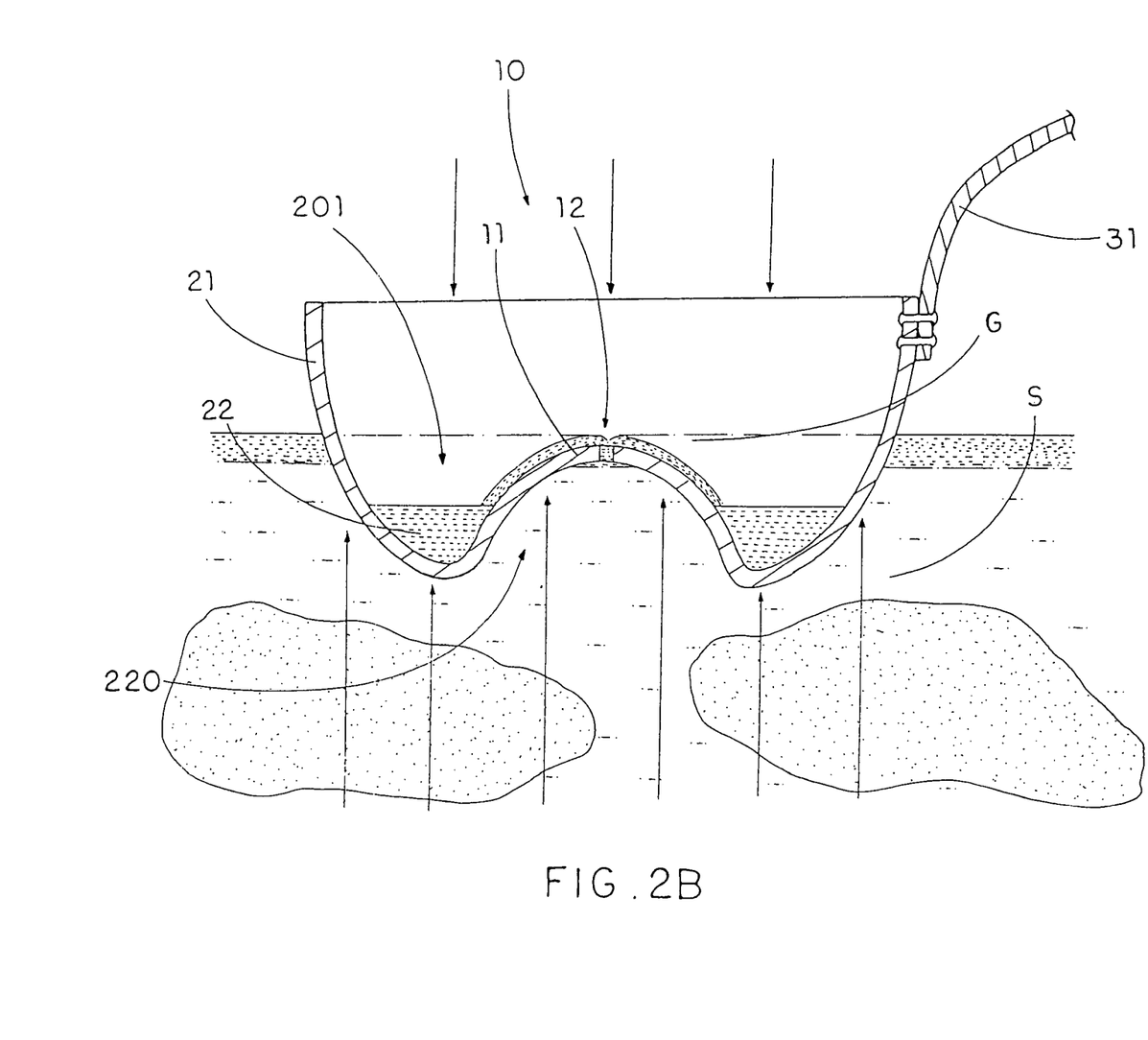

In accordance with the Pascal's law, the pressure in a fluid is the same at all points having the same elevation, wherein the shape of the container does not affect the pressure. Since the pressure of the soup S within the inner receiving cavity 220 is the same as the pressure of the soup S at an exterior of the container body 20, when the floating wing 11 is floated on top of the soup S, the soup S within the inner receiving cavity 220 having the same surface level of the grease G at the exterior of the outer surrounding wall 21, as shown in FIG. 2A. Therefore, when the floating wing 11 is pressed downwardly until the fluid outlet 12 is positioned slightly below the surface level of the grease G within the inner receiving cavity 220, the pressure of the soup S is reacted to exert upwardly with respect to the floating wing 11, so as to push the grease G floating on the soup S out of the inner receiving cavity 220 to the fluid collecting cavity 201 through the fluid outlet 12, as shown in FIG. 2B.

Due to the conical shape of the inner receiving cavity 220, the pressure of the soup S therewithin is substantially increased by reducing the cross sectional area of the inner receiving cavity 220 when the container body 20 is pressed downwardly, so as to effectively squeeze the grease G out of the inner receiving cavity 220 to the fluid collecting cavity 201 through the fluid outlet 12.

As shown in FIG. 1, the fluid filter further comprises a control member 30 upwardly extended from the container body 20 to control the downward movement of the floating wing 11 so as to adjust a position of the fluid outlet 12 with respect to the surface level of the grease G. Accordingly, the control member 30 is embodied as a handle 31 radially extended from the outer surrounding wall 21 of the container body 20, in such a manner that the user is able to hold the handle 31 of the control member 30 to press and lift the floating wing 11 slightly below and above the surface level of the grease G respectively.

In addition, since the fluid outlet 12 is sized for allowing the soup S and the grease G flowing from the inner receiving cavity 220 to the fluid collecting cavity 201 and for blocking any substance, such as the ingredients, in the soup S and the grease G entering into the fluid collecting cavity 201 so as to further filter the substance in the soup S and the grease G. In other words, only the grease G is allowed to be collected in the fluid collecting cavity 201 so as to substantially separate the grease G from the soup S.

In order to operate the fluid filter of the present invention, the user is able to place the container body 20 on the soup S while the floating wing 11 floats on the grease G and the soup S with the grease G is enclosed within the inner receiving cavity 220. Then, the user is able to apply a downward pressing force on the container body 20 via the handle 31 of the control member 30, so as to force the floating wing 11 downwardly below the surface level of the grease G. Once the fluid outlet 12 is positioned below the surface level of the grease G, the pressure of the soup S within the inner receiving cavity 220 push the grease G releasing therefrom to the fluid collecting cavity 201 through the fluid outlet 12.

By observation, when the grease G within the inner receiving cavity 220 is squeezed to flow into the fluid collecting cavity 201 by gravity, the user is able to lift up the container body 20 via the handle 31 until the fluid outlet 12 is positioned above the surface level of the grease G, so as to prevent the soup S within the inner receiving cavity 220 dispensing to the fluid collecting cavity 201. In other words, only the grease G is separated from the soup S to the fluid collecting cavity 201, so as to minimize the waste of the soup S. Therefore, the user is able to repeat the up and down movement of the fluid filter until desired amount of grease G is removed from the soup S.

It is worth to mention that the fluid filter of the present invention can effectively remove the grease G from the soup during cooking, such that the cooking time can be substantially reduced since no time is wasted for cooling down the soup until the grease G is condensed. Moreover, once the grease G is removed during cooking, no additional energy is required to heat up the grease G.

Figure 3:
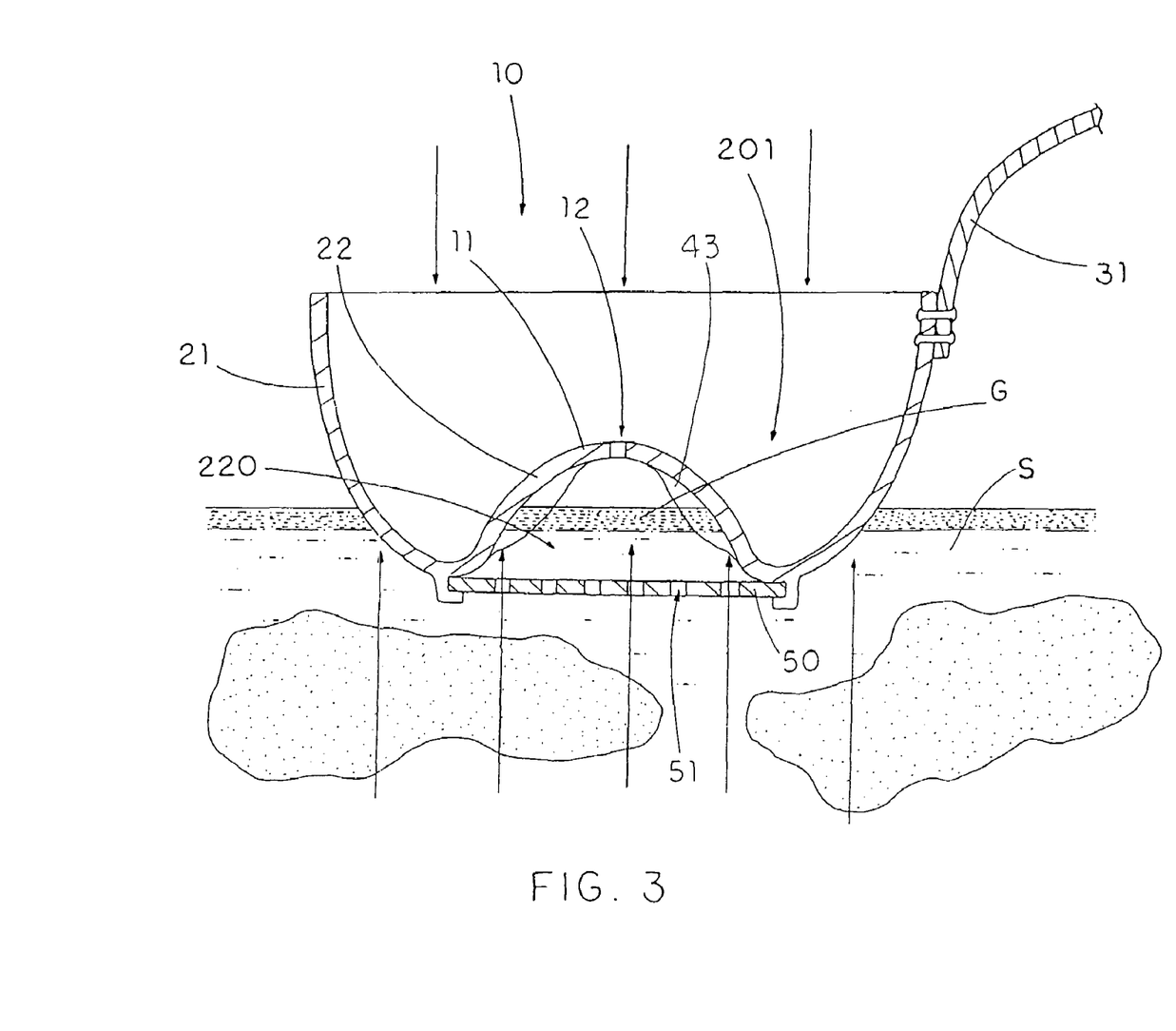
FIG. 3 illustrates the fluid filter incorporated with a substance guide according to the above first preferred embodiment of the present invention.

As shown in FIG. 3, the fluid filter further comprises a substance guide 50 mounted underneath the container body 20 at a bottom opening of the inner receiving cavity 220 wherein the substance guide 50 has a plurality of guiding meshes 51 sized for allowing the soup S and the grease G flowing into the inner receiving cavity 220 and blocking substance, such as the ingredients, floating on the soup S and the greases G entering into the inner receiving cavity 220, so as to prevent the fluid outlet 12 being stuck by the substance.

Figure 4:
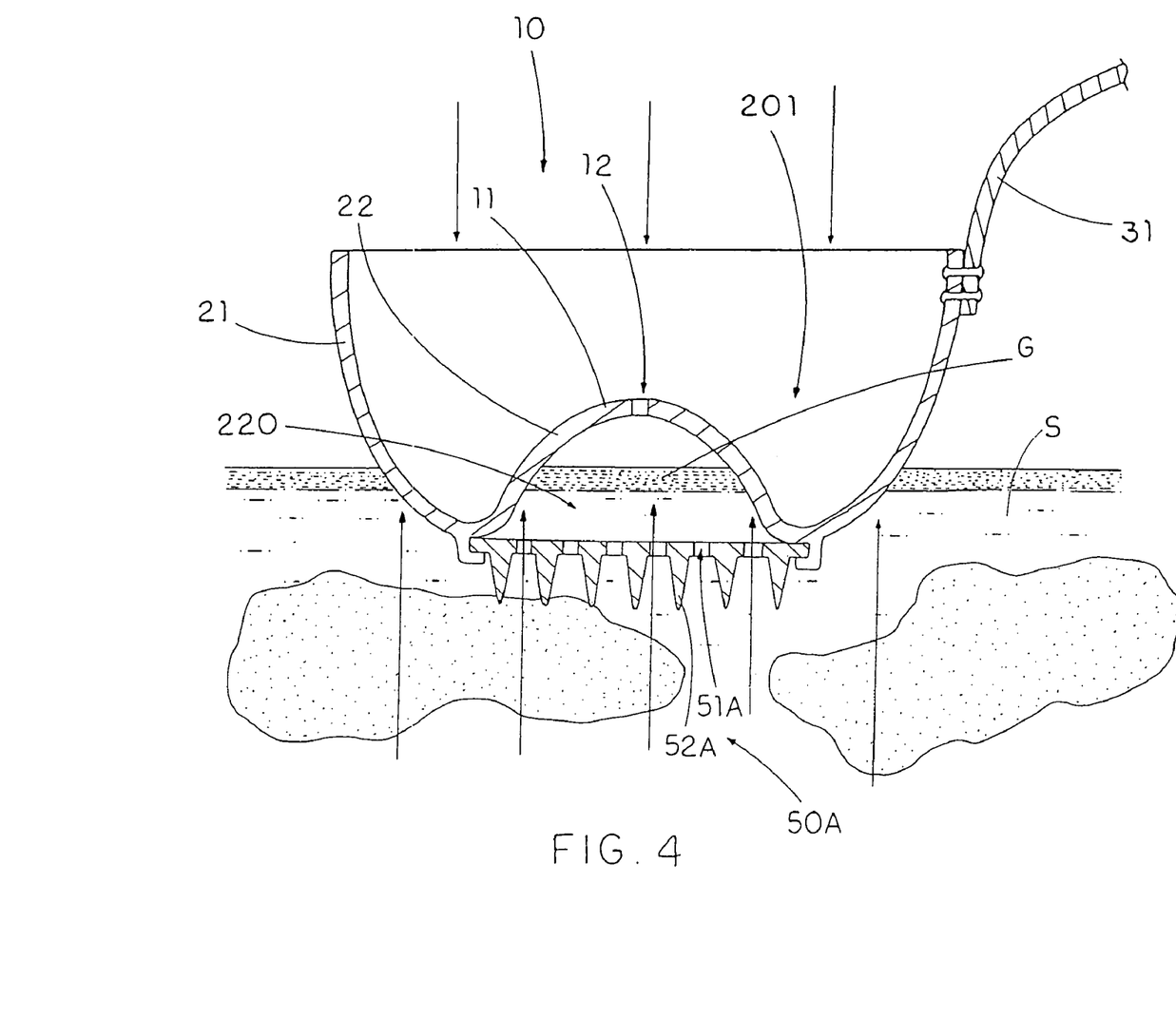
FIG. 4 illustrates an alternative mode of substance guide of the fluid filter according to the above first preferred embodiment of the present invention.

FIG. 4 illustrates an alternative mode of the substance guide 50A having a plurality of guiding meshes 51A sized for allowing the soup S and the grease G flowing into the inner receiving cavity 220 and comprising a plurality of prongs 52A extended downwardly for pressing the substance floating on the soup S and the grease G so as to block the substances sticking on the guiding meshes 51A. In other words, the prongs 52A is capable of breaking away the grease G trapped in the substance, such as the meat, and keeping the substance away from the guiding meshes 51A. Therefore, the grease G floated on the soup G and trapped in the substance can enter into the inner receiving cavity 220 through the meshes 51A for collection purpose.

Figure 5:
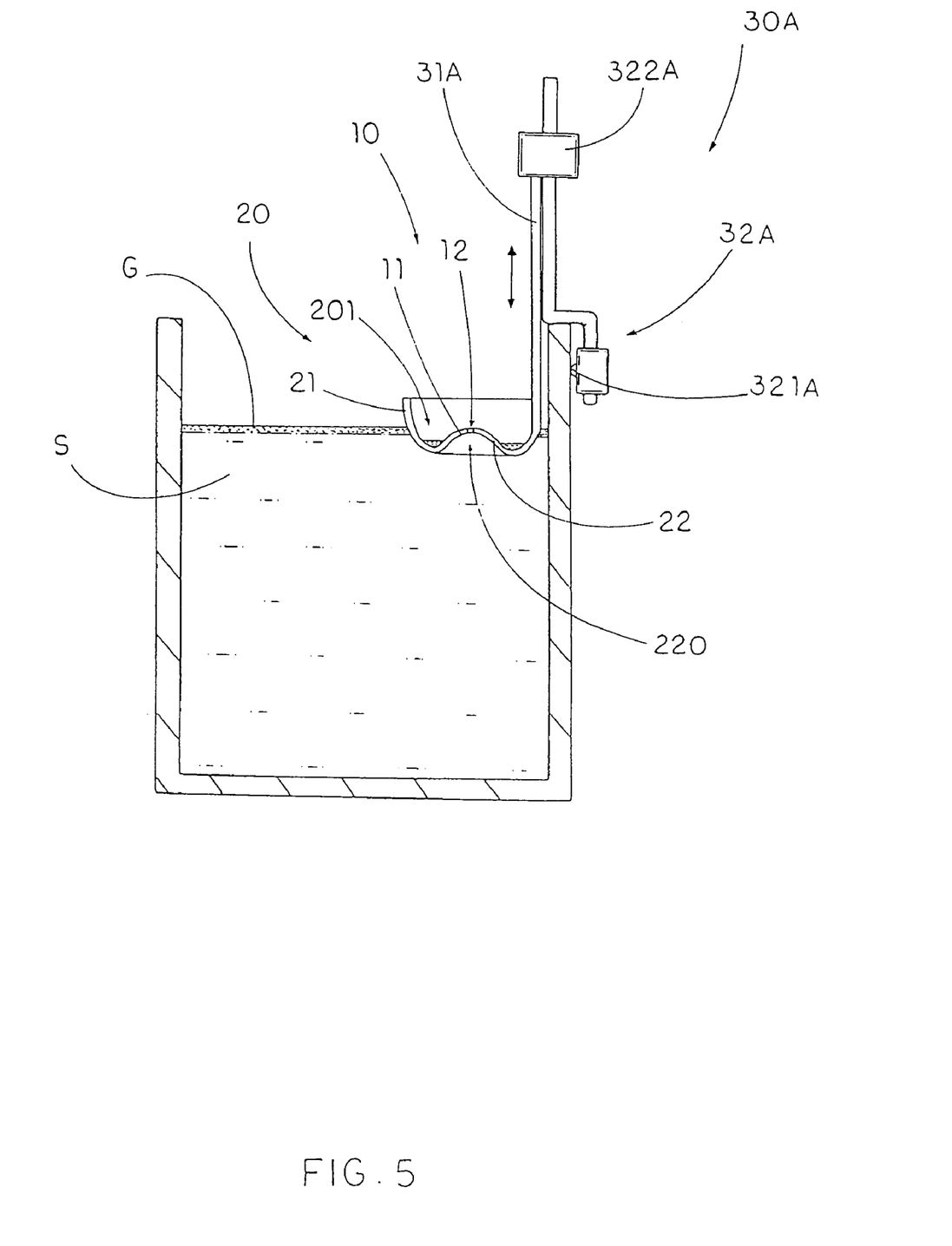
FIG. 5 illustrates an alternative mode of a control member of the fluid filter according to the above first preferred embodiment of the present invention.

FIG. 5 illustrates an alternative mode of the control member 30A which comprises a retractable arm 31A having a lower control portion extended from the outer surrounding wall 21 of the container body 20 and an upper hanging portion adapted for hanging on an top opening edge of a fluid container (kettle) at a position that the floating wing 11 floats on the grease G, and means 32A for slidably driving the hanging portion of the retractable arm 31A along the top opening edge of the soup pot so as to move the container body 20 on the soup S.

Accordingly, the retractable arm 31A is adapted to be selectively adjusted a distance between the control portion and hanging portion such that when the retractable arm 31A is hung on the top opening edge of the soup pot, the floating wing 11 is suspendedly supported to float on the grease G while the fluid outlet 12 is positioned slightly below the surface level of the grease G, so as to allow the grease G within the inner receiving cavity 220 flowing out to the fluid collecting cavity 201 through the fluid outlet 12.

The driving means 32A comprises a first rotor 321A rotatably mounted to the hanging portion of the retractable arm 31A to slidably move along the top opening edge of the kettle and a second rotor 322A operatively mounted on the retractable arm 31A to drive the container body 20 in a vertically movable manner with respect to the surface level of the grease G. Therefore, the container body 20 is driven to vertically move on surface level of the grease G to collect the soup S with the grease G in the inner receiving cavity 220, so as to collect grease G to the fluid collecting cavity 201 through the fluid outlet 12. In other words, the fluid filter can automatically collect the grease G on the soup S by moving the container body 20 on the soup S via the control member 30A.

For enhancing the grease collecting process, the user is able to place the soup pot in an inclined manner wherein the grease G accumulatively floats on the soup S at one side of the soup pot in such a manner that when container body 20 is moved to the corresponding side of the soup pot where the grease G is accumulated therewithin, a large amount of grease G is flowed through the fluid outlet 12 and collected in the fluid collecting cavity 201.

It is worth mentioning that more than one fluid outlet 12 can be spacedly formed on the floating wing 11 such that when the floating wing 11 is pressed below the surface level of the grease G, the grease G can flow to the fluid collecting cavity 201 through the fluid outlets 12, so as to enhance the grease separating operation from the soup S. Moreover, more than one inner surrounding wall 22 can be formed within the outer surrounding wall 21, wherein the fluid outlet 12 is formed on top of each of the inner surrounding walls 22 to communicate with the respective inner receiving cavity 220 thereof. Therefore, more amount of soup S with grease G is enclosed within the inner receiving cavity 220 so as to speed up the grease separating process of the fluid filter of the present invention.

Figure 6:
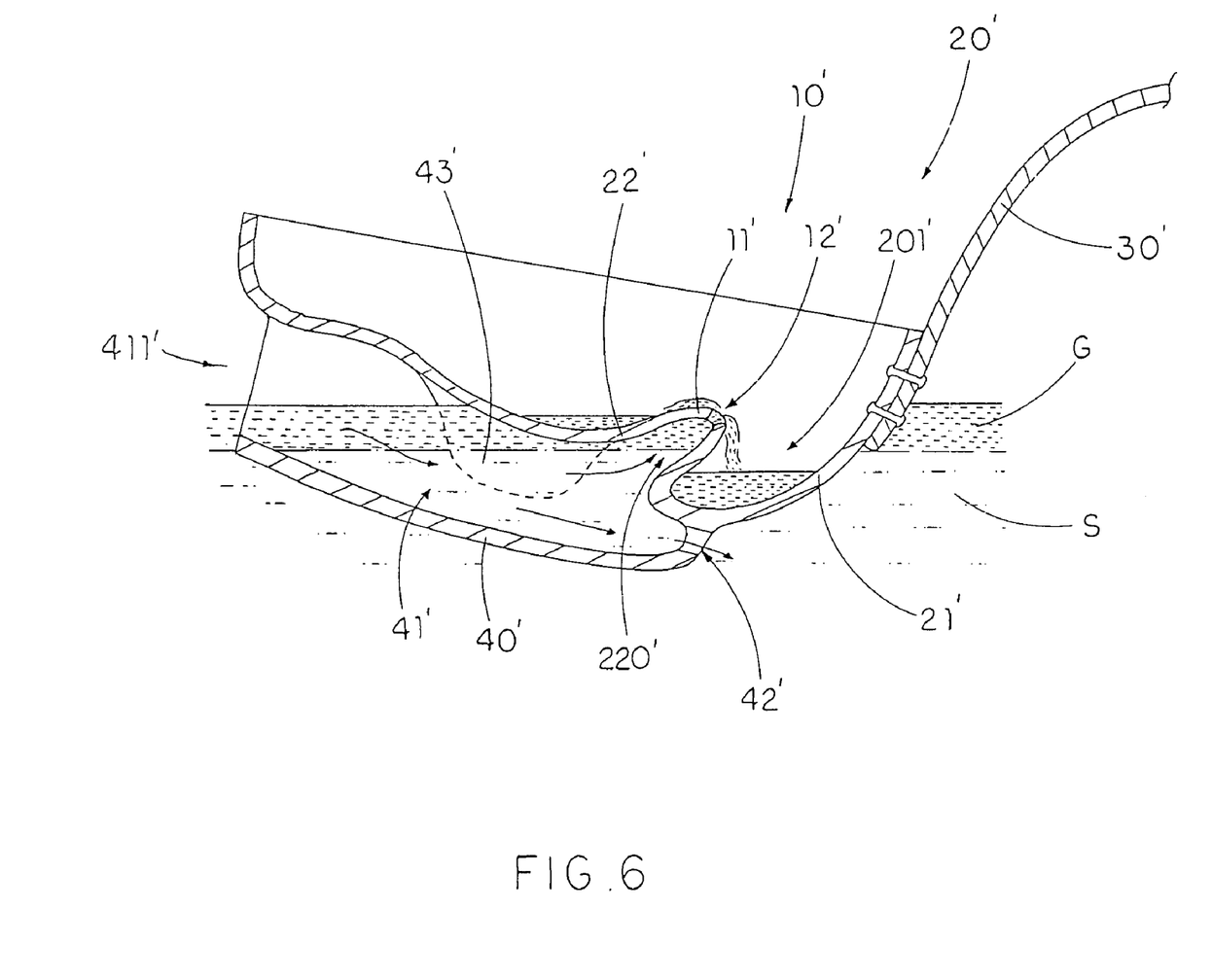
FIG. 6 is a longitudinal sectional view of a fluid filter according to a second preferred embodiment of the present invention.

As shown in FIG. 6, a fluid filter of a second embodiment illustrates an alternative mode of the first embodiment, wherein the fluid filter comprises at least a fluid filtering arrangement 10' comprising a floating wing 11' adapted for floating on the grease G and having at least a fluid outlet 12' formed on the floating wing 11', and a container body 20', which is extended from the floating wing 11', having a fluid collecting cavity 201' communicating with the fluid outlet 12' wherein the fluid outlet 12' is formed at a position above the fluid collecting cavity 201'.

The container body 20' comprises an outer surrounding wall 21' and an inner surrounding wall 22', defining an inner receiving cavity 220', integrally extended from the outer surrounding wall 21' at a bottom edge thereof to form the fluid collecting cavity 201' therebetween, wherein the floating wing 11' is extended from an upper end portion of the inner surrounding wall 22' in such a manner that the fluid collecting cavity 201' is communicated with the inner receiving cavity 220' through the fluid outlet 12' for allowing the grease G within the inner receiving cavity 220' to flow into the fluid collecting cavity 201'.

The fluid filter further comprises a fluid guider 40' extended from the outer surrounding wall 22' to a position underneath the container body 20' to form a fluid guiding channel 41', having a fluid entrance 411', between the fluid guider 40' and a bottom side of the container body 20' to communicate with the inner receiving cavity 220', wherein when the floating wing 11' floats on the grease G, the soup S with the grease G is guided to flow into the inner receiving cavity 220' from the fluid entrance 411' through the fluid guiding channel 41'.

As shown in FIG. 6, the fluid guider 40' further has a fluid exit 42' provided thereon for communicating with the guiding channel 41', wherein the fluid exit 42' allows the soup S exiting from the guiding channel 41' to outside in such a manner that large amount of soup G and grease G can be entered into the guiding channel 41' while the grease G is collected within the fluid collecting cavity 201' through fluid outlet 12' and the soup G is flowed to outside through the fluid exit 42', so as to balance the flow of the soup G.

Figure 7:
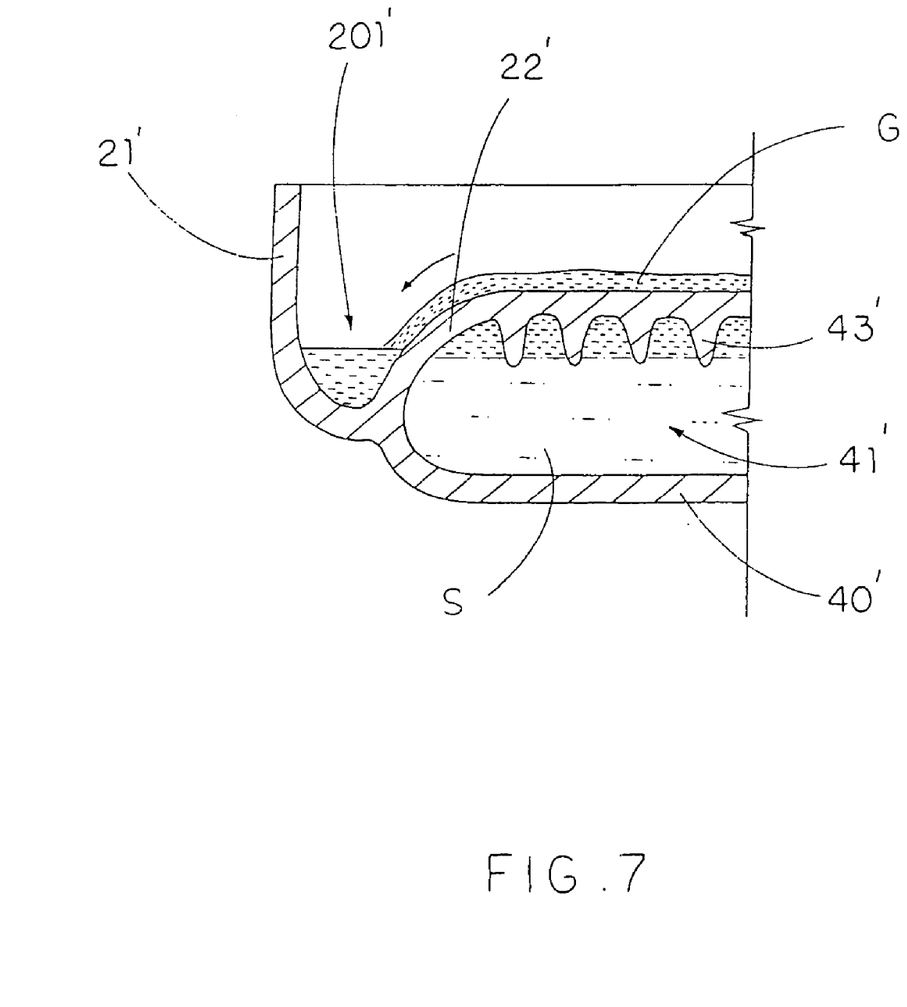
FIG. 7 is a transverse sectional view of the fluid filter according to the above second preferred embodiment of the present invention.

In addition, the fluid guider 40' further comprises a plurality of guiding fins 43' spacedly and downwardly extended from the bottom side of the container body 20' for guiding the soup S and grease G flowing towards the inner receiving cavity 220' through the guiding channel 41', as shown in FIG. 7. It is worth to mention that the guiding fins 43' are adapted for stabilizing the flow of the soup S and grease G within the guiding channel 41' so as to ensure the grease G floats on top of the soup S. Therefore, the grease G is guided to enter into the inner receiving cavity 220' so as to efficiently remove the grease G on the soup S.

The fluid filter further comprises a control member 30' upwardly extended from the outer surrounding wall 21' of the container body 20' to not only control the downward movement of the floating wing 11' so as to guide the grease G flowing to the fluid collecting cavity 201' through the fluid outlet 12' but also the forward movement of the container body 20' so as to guide the soup S with the grease G flowing into the fluid guiding channel 41' through the fluid entrance 411'.

In order to operate the fluid filter, the user is able to move the container body 20' on the surface level of the grease G via the control member 30' to guide the soup S entering into fluid guiding channel 41' through the fluid entrance 411' so as to collect the grease G within the inner receiving cavity 220'. Then, by downwardly pressing the floating wing 11' via the control member 30' until the fluid outlet 12' is positioned slightly below the surface level of the grease G, the grease G within the inner receiving cavity 220' is flowed out to the fluid collecting cavity 201' through the fluid outlet 12'. By observation, when the grease G is flowed out from the inner receiving cavity 220', the container body 20' is lifted up that the fluid outlet 12' is positioned above the surface level of the grease G so as to stop the soup S flowing to the fluid collecting cavity 201'.

It is worth mentioning that when the soup S is entered into the fluid guiding channel 41' through the fluid entrance 411', the grease G is stayed in the fluid guiding channel 41' and the inner receiving cavity 220'. Therefore, even the soup S is stirred to break down the grease G, the grease G is trapped within the fluid guiding channel 41'. In other words, the grease G can be substantially collected within the fluid guiding channel 41' and separated from the soup S to the fluid collecting cavity 201'.

In view of above, the fluid filter can substantially separate the less dense fluid from the high dense fluid by using their physical properties and collect the less dense fluid from the high dense fluid into the fluid collecting cavity. In addition, the fluid filter of the present invention can be applied for separating the motor oil from the water since the motor oil having lesser density floats on top of the water.

Figure 8:
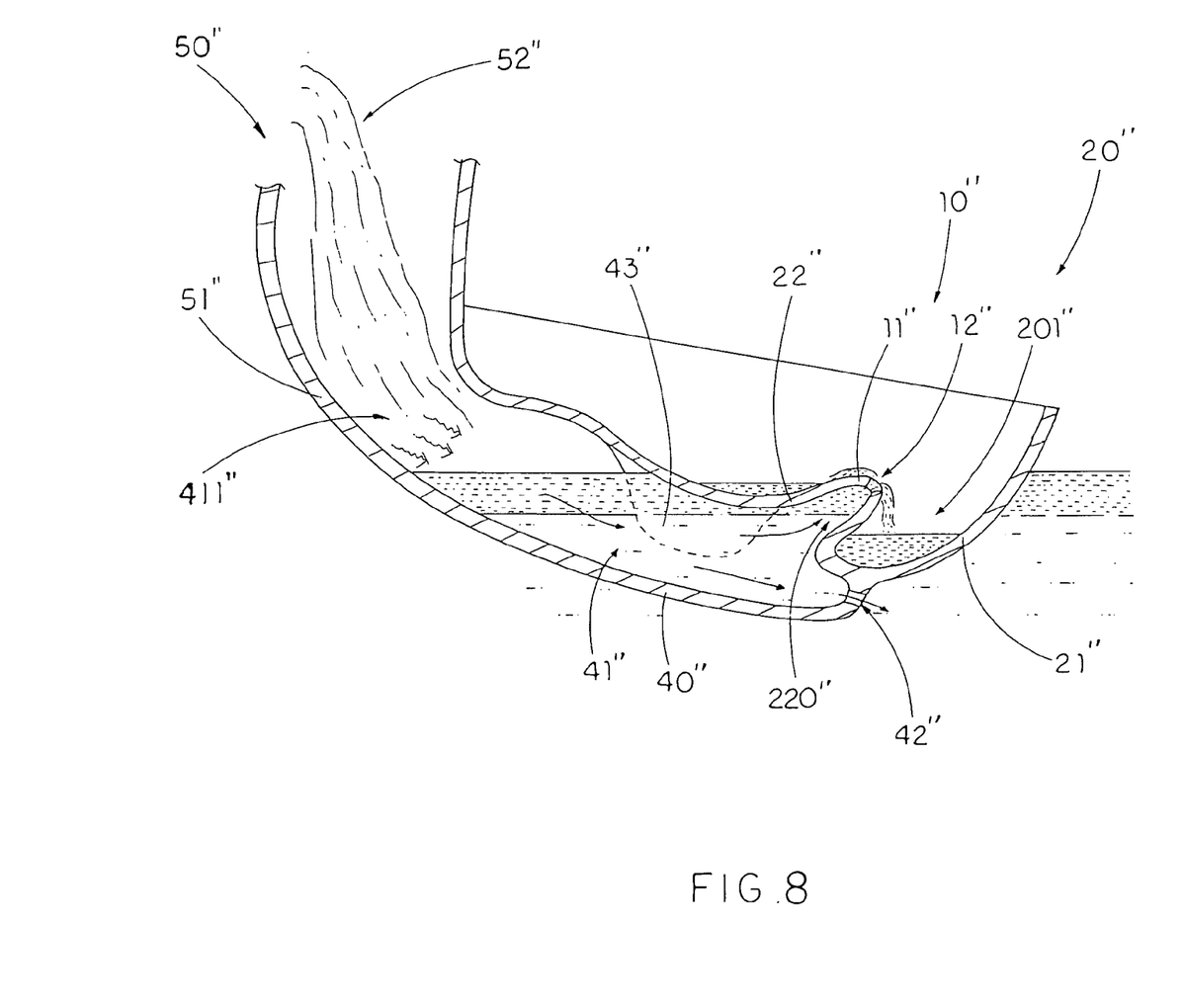
FIG. 8 is a sectional view of the fluid filter according a third preferred embodiment of the present invention.
Figure 9:
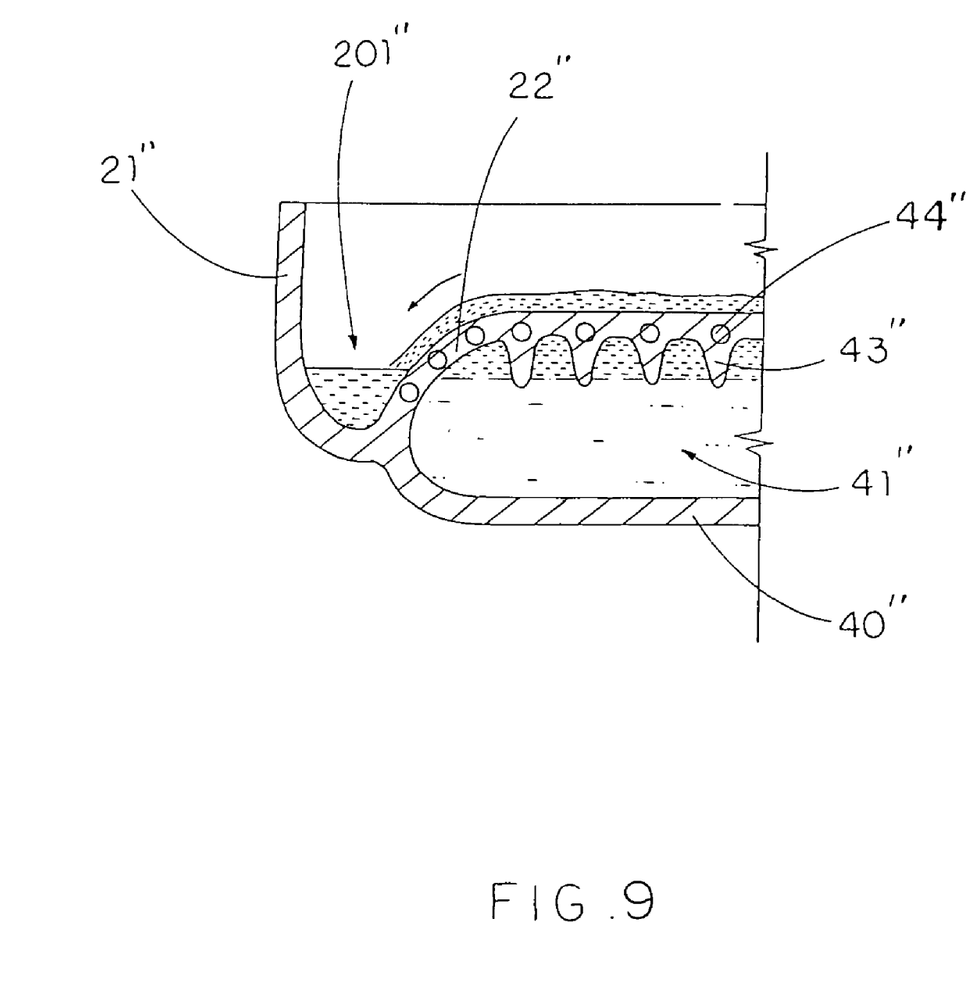
FIG. 9 is a partial sectional view of the fluid filter according to the third preferred embodiment of the present invention.

Referring to FIG. 6, FIG. 8 and FIG. 9, the fluid filter of a third embodiment of the present invention is illustrated. According to the third embodiment of the present invention, the fluid filter is utilized to separate, trap, as well as collect the crude oil afloat on the water surface, such as the ocean water.

That is to say, the crude oil filtering arrangement 10" of the third embodiment of the present invention could be applied as oil skimming vessel for salvaging the crude oil leaking disaster. Here, the floating wing 11" is defined within a skimmer vessel, and to have a crude oil outlet 12" allowing the crude oil O floated on the water surface upwardly poured from the crude oil outlet 12".

The fluid filter further comprises means for feeding the water and crude oil into the guiding channel through the fluid entrance.

First of all, the feeding means could be embodied as the control member 30", which is applied as a hoister mounted to a vessel, such as a tug boat or any salvage boats, for treating crude oil spilling disaster. In that case, the control member 30" are moveably mounted to a boat with a retractable manner, so that the operator or crew member of the boat could adjustably change the orientation of the container body 20" towards the polluted water for optimally trapping the crude oil.

Furthermore, the container body 20" is defined to have a crude oil collecting cavity 201 for containing tons of oil O. Since the crude oil outlet 12" is formed at an apex above the crude oil collecting cavity 201", the container body 20", which is moveably mounted to a tug boat, could be disposed afloat on the ocean for continuously trap and skim the crude oil O. As a result, the crew members of the tug boat could selectively cruise the vessel to collect the oil O, and more importantly, the crew members of the tug boat could purposely adjust the elevation of the container body 20" for ensuring the crude oil outlet 12" is perfectly and snugly positioned soaked within the crude oil layer afloat-on the water surface. That is to say, during the salvaging process, the user could proceedingly adjust the elevation of the container body 20" until all the crude oil O had been collected into the crude oil collecting cavity 201".

In other words, the control member 30" mounted to the tug ship could provide a downward force to the floating wing 11" until the crude oil outlet 12" is slightly positioned below the surface level of the crude Oil O, afterwards, the crude oil O is allowed to flow into the crude oil collecting cavity 201" through the crude oil outlet 12" by gravity. Therefore, the container body 20" of such oil skimmer could be employed to float on the water for continuously trapping the crude oil afloat on the water surface in case the crude oil collecting cavity 201" is big enough.

For this purpose, the outer surrounding wall 21" and an inner surrounding wall 22" could be defined as vessel body made of steel or other ship-making materials. Preferably, the outer surrounding wall 21" and the inner surrounding wall 22" are integrally formed in such a manner that the oil collecting cavity 201" is communicated with the inner receiving cavity 220" for allowing the crude oil O within the inner receiving cavity 220" flowing into the oil collecting cavity 201" through the oil outlet 12". It is noted that a plugging device could be provided for purposely blocking the oil outlet 12" enabling such container body 20" as an unsinkable vessel floating on the water surface. As a result, after the oil collecting cavity 201" is filled with crude oil O, the user could block the oil outlet 12" by inserting the plugging device, afterwards, tow this container 20" body away.

In short, when the container body 20" is lowered by the control member 30", which is maneuvered by a tug boat hoist, until the crude oil outlet 12" is positioned slightly below the surface level of the water, the pressure of the water is reacted to exert upwardly with respect to the floating wing 11", so as to push the afloat crude oil O out of the inner receiving cavity 220" to the crude oil collecting cavity 201" through the crude oil outlet 12".

According to the present invention, the fluid guider 40" extended from the outer surrounding wall 22" at a position underneath the container body 20" forming a fluid guiding channel 41" for receiving the crude oil polluted water at the cruising direction of the tug ship. Whenever the tug ship is oriented into polluted area, polluted water would be flow into the guiding channel 41" via the fluid entrance 411". As a result, the crude oil O could be collected within the crude oil collecting cavity 201" through the crude oil outlet 12" and the water is flowed to outside through the fluid exit 42".

Accordingly, the fluid filter of the present invention could effectively salvage the spilled oil O from a marina pollution disaster. There is no awkward boom and skimmers provided to treat the variable and drifting oil afloat on the water surface. Instead, the salvager could steer their ship to flow or chase the oil in an efficient and convenient way.

However, once the salvaging process is imminent and urgent, which means the spilled crude oil must be recovered as soon as possible. A plurality of salvaging ships would be dispatched for collecting the crude oil. Obviously, a time-saving recovering method is to pump such polluted water into an oil filter. As shown in FIG. 8, the oil filter of the present invention is provided for coordinating such water-recycling process, wherein the feeding means is a feeding chamber 50" having a feeding guider 51" upwardly and integrally extended from the fluid guider 40", and a top opening 52".

Accordingly, the feeding chamber 50" is adapted to convert and prolong the fluid guider 40", so that the polluted crude oil could be dumped or poured into the feeding chamber 50" through the top opening 52" and directed into the guiding channel 41". As a result, the crude oil O with less density could be collected within the crude oil collecting cavity 201" through the crude oil outlet 12" and the water is discharged to outside through the fluid exit 42".

Here, it is worth to mention that oil afloat on the water surface is prone to be agglomerated or solidified under a harsh weather. According to the present invention, the fluid guider 40" further comprises a plurality of guiding fins 43" spacedly and downwardly extended from the bottom side of the container body 20". It is noted that the guiding channel 41" equipped with the guiding fins 43" are purposed to break up such agglomerated oil O for effectively separating the oil O from the water. And more importantly, the guiding fins 43" are adapted for stabilizing the flow of the oil O within the guiding channel 41".

As shown in FIG. 9, the fluid guider 40" further comprises heat means 44" provided within the bottom side of the container body 20" for heating the oil O flowing through the guiding channel 41". Due to the fact that crude oil O afloat on the cold water is susceptible to be frozen or agglomerated, the guiding fins 43" and the heating means are adapted to dissolve the agglomerated oil O so as to facilitate the oil separating process. Here, the heating means could be applied as electrical heating wires received within the container body 20" or directly disposed into each of the guiding pins 43".

What is claimed is:

1. A fluid filter for separating a crude oil from a water, comprising:

at least a crude oil filtering arrangement comprising a floating wing adapted for floating on said water, and having at least a crude oil outlet formed on said floating wing;

a container body, which is extended from said floating wing, having a crude oil collecting cavity communicating with said crude oil outlet, wherein said crude oil outlet is formed at a peak of said crude oil collecting cavity, said container body has an inner receiving cavity communicated with said crude oil collecting cavity via said crude oil outlet; and a fluid guider extended from said container body to a position underneath said container body to form a guiding channel, having a fluid entrance, between said fluid guider and a bottom side of said container body to communicate with said inner receiving cavity, wherein said fluid guider further has a water exit communicating with said guiding channel for allowing said water exiting from said guiding channel to outside so as to balance a flow of said crude oil within said guiding channel, in such a manner that said fluid guider is arranged for said water with said crude oil entering into said guiding channel at said fluid entrance, said water with said crude oil is guided to flow into said inner receiving cavity from said fluid entrance through said fluid guiding channel such that when said container body is disposed with an elevation until said crude oil outlet is slightly positioned below a surface level of said crude oil, said crude oil is allowed to flow into said crude oil collecting cavity through said crude oil outlet by gravity so as to separate said crude oil from said water.

2. The fluid filter, as recited in claim 1, further comprising a heating element provided within a bottom side of said container body for maintaining said crude oil in a fluid condition when flowing into said guiding channel.

3. The fluid filter, as recited in claim 2, wherein said container body comprises an outer surrounding wall and an inner surrounding wall to form said inner receiving cavity, wherein said heating element is embedded in said inner surrounding wall for warming said crude oil within said guiding channel.

4. The fluid filter, as recited in claim 3, wherein said fluid guider further comprises a plurality of guiding fins spacedly and downwardly extended from said bottom side of said container body for guiding and stabilizing said crude oil and said water flowing towards said inner receiving cavity through said guiding channel.

5. The fluid filter, as recited in claim 4, wherein said inner surrounding wall is formed as a hollow conical shape such that said inner receiving cavity has a cross sectional area gradually reducing towards a peak thereof, wherein said crude oil outlet is formed at said peak of said inner surrounding wall, wherein said outer surrounding wall has a height higher than a height of said inner surrounding wall in such a manner that when said crude oil outlet is moved slightly below said surface level of said water for allowing said crude oil flowing through said crude oil outlet, a top edge of said outer surrounding wall is positioned above said surface level of said crude oil, so that said outer surrounding wall is capable of retaining said crude oil within said crude oil collecting cavity.

6. The fluid filter, as recited in claim 3, further comprising means for feeding said water with said crude oil into said guiding channel through said fluid entrance.

7. The fluid filter, as recited in claim 6, wherein said feeding means is a control member upwardly extended from said container body to control a movement of said container body, wherein by vertically displacing said control member, said crude oil filtering arrangement is capable of continuously adjusting said elevation of said container body so as to ensure said crude oil outlet well below said surface level of said crude oil in process, wherein said control member is mounted to a vessel, so that by cruising said vessel into different directions, said container body is capable of being shifted with respect to said crude oil afloat on said water so as to ensure fluid entrance be oriented towards said crude oil for effectively trapping said crude oil and facilitating said crude oil and said water flow into said guiding channel.

8. The fluid filter, as recited in claim 6, wherein said feeding means is a feeding chamber having a feeding guider upwardly and integrally extended from said fluid guider, and a top opening, wherein said water with said crude oil are dumped into said feeding chamber through said top opening and to be directed into said guiding channel for collecting said crude oil within said crude oil collecting cavity and for discharging said water from said water exit.

9. The fluid filter, as recited in claim 6, wherein said inner surrounding wall is formed as a hollow conical shape such that said inner receiving cavity has a cross sectional area gradually reducing towards a peak thereof, wherein said crude oil outlet is formed at said peak of said inner surrounding wall, wherein said outer surrounding wall has a height higher than a height of said inner surrounding wall in such a manner that when said crude oil outlet is moved slightly below said surface level of said water for allowing said crude oil flowing through said crude oil outlet, a top edge of said outer surrounding wall is positioned above said surface level of said crude oil, so that said outer surrounding wall is capable of retaining said crude oil within said crude oil collecting cavity.

10. The fluid filter, as recited in claim 3, wherein said inner surrounding wall is formed as a hollow conical shape such that said inner receiving cavity has a cross sectional area gradually reducing towards a peak thereof, wherein said crude oil outlet is formed at said peak of said inner surrounding wall, wherein said outer surrounding wall has a height higher than a height of said inner surrounding wall in such a manner that when said crude oil outlet is moved slightly below said surface level of said water for allowing said crude oil flowing through said crude oil outlet, a top edge of said outer surrounding wall is positioned above said surface level of said crude oil, so that said outer surrounding wall is capable of retaining said crude oil within said crude oil collecting cavity.

11. The fluid filter, as recited in claim 2, wherein said fluid guider further comprises a plurality of guiding fins spacedly and downwardly extended from said bottom side of said container body for guiding and stabilizing said crude oil and said water flowing towards said inner receiving cavity through said guiding channel.

12. The fluid filter, as recited in claim 2, further comprising means for feeding said water with said crude oil into said guiding channel through said fluid entrance.

13. The fluid filter, as recited in claim 12, wherein said feeding means is a control member upwardly extended from said container body to control a movement of said container body, wherein by vertically displacing said control member, said crude oil filtering arrangement is capable of continuously adjusting said elevation of said container body so as to ensure said crude oil outlet well below said surface level of said crude oil in process, wherein said control member is mounted to a vessel, so that by cruising said vessel into different directions, said container body is capable of being shifted with respect to said crude oil afloat on said water so as to ensure fluid entrance be oriented towards said crude oil for effectively trapping said crude oil and facilitating said crude oil and said water flow into said guiding channel.

14. The fluid filter, as recited in claim 13, wherein said inner surrounding wall is formed as a hollow conical shape such that said inner receiving cavity has a cross sectional area gradually reducing towards a peak thereof, wherein said crude oil outlet is formed at said peak of said inner surrounding wall, wherein said outer surrounding wall has a height higher than a height of said inner surrounding wall in such a manner that when said crude oil outlet is moved slightly below said surface level of said water for allowing said crude oil flowing through said crude oil outlet, a top edge of said outer surrounding wall is positioned above said surface level of said crude oil, so that said outer surrounding wall is capable of retaining said crude oil within said crude oil collecting cavity.

15. The fluid filter, as recited in claim 12, wherein said feeding means is a feeding chamber having a feeding guider upwardly and integrally extended from said fluid guider, and a top opening, wherein said water with said crude oil are dumped into said feeding chamber through said top opening and to be directed into said guiding channel for collecting said crude oil within said crude oil collecting cavity and for discharging said water from said water exit.

16. The fluid filter, as recited in claim 15, wherein said inner surrounding wall is formed as a hollow conical shape such that said inner receiving cavity has a cross sectional area gradually reducing towards a peak thereof, wherein said crude oil outlet is formed at said peak of said inner surrounding wall, wherein said outer surrounding wall has a height higher than a height of said inner surrounding wall in such a manner that when said crude oil outlet is moved slightly below said surface level of said water for allowing said crude oil flowing through said crude oil outlet, a top edge of said outer surrounding wall is positioned above said surface level of said crude oil, so that said outer surrounding wall is capable of retaining said crude oil within said crude oil collecting cavity.

17. The fluid filter, as recited in claim 12, wherein said inner surrounding wall is formed as a hollow conical shape such that said inner receiving cavity has a cross sectional area gradually reducing towards a peak thereof, wherein said crude oil outlet is formed at said peak of said inner surrounding wall, wherein said outer surrounding wall has a height higher than a height of said inner surrounding wall in such a manner that when said crude oil outlet is moved slightly below said surface level of said water for allowing said crude oil flowing through said crude oil outlet, a top edge of said outer surrounding wall is positioned above said surface level of said crude oil, so that said outer surrounding wall is capable of retaining said crude oil within said crude oil collecting cavity.

18. The fluid filter, as recited in claim 1, further comprising means for feeding said water with said crude oil into said guiding channel through said fluid entrance.

19. The fluid filter, as recited in claim 18, wherein said feeding means is a control member upwardly extended from said container body to control a movement of said container body, wherein by vertically displacing said control member, said crude oil filtering arrangement is capable of continuously adjusting said elevation of said container body so as to ensure said crude oil outlet well below said surface level of said crude oil in process, wherein said control member is mounted to a vessel, so that by cruising said vessel into different directions, said container body is capable of being shifted with respect to said crude oil afloat on said water so as to ensure fluid entrance be oriented towards said crude oil for effectively trapping said crude oil and facilitating said crude oil and said water flow into said guiding channel.

20. The fluid filter, as recited in claim 18, wherein said feeding means is a feeding chamber having a feeding guider upwardly and integrally extended from said fluid guider, and a top opening, wherein said water with said crude oil are dumped into said feeding chamber through said top opening and to be directed into said guiding channel for collecting said crude oil within said crude oil collecting cavity and for discharging said water from said water exit.

* * * * *